US012395625B2

(12) United States Patent
Tourapis et al.

(10) Patent No.: US 12,395,625 B2
(45) Date of Patent: Aug. 19, 2025

(54) REFERENCE PICTURE MANAGEMENT AND LIST CONSTRUCTION

(71) Applicant: Apple Inc., Cupertino, CA (US)

(72) Inventors: Alexandros Tourapis, Milpitas, CA (US); Jungsun Kim, Cupertino, CA (US); Krishnakanth Rapaka, San Jose, CA (US); David William Singer, San Francisco, CA (US)

( * ) Notice: Subject to any disclaimer, the term of this patent is extended or adjusted under 35 U.S.C. 154(b) by 0 days.

(21) Appl. No.: 18/526,481

(22) Filed: Dec. 1, 2023

(65) Prior Publication Data

US 2024/0114128 A1 Apr. 4, 2024

Related U.S. Application Data

(63) Continuation of application No. 17/540,356, filed on Dec. 2, 2021, now Pat. No. 11,863,738, which is a continuation of application No. 16/669,385, filed on Oct. 30, 2019, now Pat. No. 11,196,988.

(60) Provisional application No. 62/786,771, filed on Dec. 31, 2018, provisional application No. 62/780,848, filed on Dec. 17, 2018.

(51) Int. Cl.
*H04N 19/105* (2014.01)
*H04N 19/172* (2014.01)
*H04N 19/174* (2014.01)
*H04N 19/184* (2014.01)
*H04N 19/513* (2014.01)
*H04N 19/70* (2014.01)

(52) U.S. Cl.
CPC ......... *H04N 19/105* (2014.11); *H04N 19/172* (2014.11); *H04N 19/174* (2014.11); *H04N 19/184* (2014.11); *H04N 19/513* (2014.11); *H04N 19/70* (2014.11)

(58) Field of Classification Search
None
See application file for complete search history.

(56) References Cited

U.S. PATENT DOCUMENTS 11,343,530 B2 * 5/2022 Lee ..................... H04N 19/56
2012/0189053 A1 7/2012 Chen et al.
(Continued)

OTHER PUBLICATIONS

Bross et al.; "Versatile Video Coding (Draft 3)"; Joint Video Experts Team; Document: JVET-LI006-v6; Oct. 2018; 204 pages.
(Continued)

*Primary Examiner* — Stefan Gadomski

(57) ABSTRACT

Techniques for encoding video with motion compensation include a compressed bitstream syntax that includes a list of all motion prediction reference frames without distinguishing between short-term reference frame and long-term reference frames. The list of reference frames may be provided in a slice header and may apply to encoded data video data within the corresponding slice. The list may be prefaced with a single number indicating the total number of reference frames. In an aspect delta POC reference numbers may be encoded with a flag indicating the sign of the delta POC when the absolute value of the POC is not equal to zero. In another aspect, a flag may be encoded for every reference frame indicating if POC information should be used when scaling prediction references, and a weighting parameter may be included when POC information should be used.

14 Claims, 2 Drawing Sheets

(56) References Cited

U.S. PATENT DOCUMENTS

| | | |
|---|---|---|
| 2012/0189058 A1 | 7/2012 | Chen et al. |
| 2012/0250765 A1 | 10/2012 | Wu et al. |
| 2013/0003850 A1 | 1/2013 | Sugio et al. |
| 2013/0077677 A1 | 3/2013 | Wang et al. |
| 2013/0089134 A1 | 4/2013 | Wang et al. |
| 2013/0101034 A1 | 4/2013 | Wahadaniah et al. |
| 2013/0107953 A1 | 5/2013 | Chen et al. |
| 2013/0114742 A1 | 5/2013 | Hannuksela et al. |
| 2013/0188738 A1 | 7/2013 | Hannuksela et al. |
| 2013/0215975 A1 | 8/2013 | Samuelsson et al. |
| 2014/0003521 A1 | 1/2014 | Lee et al. |
| 2014/0016699 A1 | 1/2014 | Chen et al. |
| 2014/0169459 A1 | 6/2014 | Zhang et al. |
| 2014/0205014 A1 | 7/2014 | Nakamura et al. |
| 2014/0211856 A1 | 7/2014 | Sugio et al. |
| 2014/0286427 A1 | 9/2014 | Fukushima et al. |
| 2015/0304671 A1 | 10/2015 | Deshpande |
| 2015/0334399 A1 | 11/2015 | Hendry et al. |
| 2016/0323573 A1 | 11/2016 | Ikai |
| 2017/0244966 A1* | 8/2017 | Joshi .................. H04N 19/593 |
| 2017/0310961 A1 | 10/2017 | Liu et al. |
| 2018/0160122 A1 | 6/2018 | Xu et al. |
| 2018/0184093 A1 | 6/2018 | Xu et al. |
| 2019/0141320 A1 | 5/2019 | Wang et al. |
| 2020/0221097 A1 | 7/2020 | Laroche et al. |

OTHER PUBLICATIONS

Bross et al.; "Versatile Video Coding (Draft 2)"; Joint Video Experts Team; Document: JVET-K1001-v6; Jul. 2018; 146 pages.

Hannuksela et al.; "AHG21: Removal of reference picture list modification"; Joint Collaborative Team on Video Coding; Document: JCTVC-H0426; Feb. 2012; 10 pages.

Wang et al.; "On Reference Picture Management for VVC"; Joint Video Experts Team; JVET-M0128-v1; Jan. 2019; 9 pages.

International Patent Application No. PCT/US2019/059429; Invitation to Pay Add'l Fees; dated Feb. 6, 2020; 17 pages.

International Patent Application No. PCT/US2019/059429; Int'l Search Report and the Written Opinion; dated Apr. 6, 2020; 40 pages.

"Series H: Audiovisual and Multimedia Systems: Infrastructure of audiovisual services—Coding of moving video—High efficiency video coding"; Telecommunication Standardization Sector; ITU-T H.265; Feb. 2018; 692 pages.

International Patent Application No. PCT/US2019/059429; Int'l Preliminary Report on Patentability; dated Jul. 1, 2021; 13 pages.

* cited by examiner

100

200

300

REFERENCE PICTURE MANAGEMENT AND LIST CONSTRUCTION

CROSS REFERENCE TO RELATED APPLICATIONS

This application is a Continuation of U.S. patent application Ser. No. 17/540,356, filed Dec. 2, 2021; which is a Continuation of U.S. patent application Ser. No. 16/669,385, filed Oct. 30, 2019, which claims the benefit of priority under 35 USC 119 (e) of U.S. Provisional Application No. 62/780,848, filed on Dec. 17, 2018, and U.S. Provisional Application No. 62/786,771, filed on Dec. 31, 2018.

BACKGROUND

The present disclosure is directed to video coding and decoding techniques and, in particular, management of lists of prediction reference frames.

Inter prediction is a key component of modern video codecs. This process permits the use of previously encoded images as prediction references for the currently encoded image and can considerably impact the coding efficiency of a video codec. Although, theoretically, one could potentially use all previously coded pictures as prediction references, that can have considerably implications in memory as well as signaling of which references to be used. This is because in such case, all such pictures would have to be retained in memory while a rather large index would have to be associated with them and referenced when specifying the references to be used for prediction for each image.

SUMMARY

In an aspect, techniques for managing a decoded picture buffer (DPB) may include deriving, from a bitstream of a coded sequence of pictures, a list of all reference pictures that may be used in decoding a portion, such as a slice layer, of bitstream syntax. The bitstream syntax indicating the list of reference pictures may essentially consist of a single list of reference pictures including single number indicating the total number of all reference frames. The contents of a DPB may then be managed by evicting any decoded pictures from the DPB that are not in the list.

In further aspects of these techniques, reference frames in the single list may be identified by a difference in a picture order count (POC) between a current frame and an identified reference frame. In a further aspect, the reference pictures may be defined by a communication syntax according to Table 3. In a further aspect, the bitstream syntax for the difference in POC may include a magnitude of the difference, and, if the magnitude is not zero, a flag indicating a sign of the difference. In a further aspect, the reference pictures may be defined by a communication syntax according to Table 2. In a further aspect, the bitstream syntax for the difference in POC may include: for the first reference frame in the list, a magnitude of the difference, and always includes a flag indicating a sign of the difference; and for subsequent reference frames in the list, a magnitude of the difference, and, only if the magnitude is not zero, a flag indicating a sign of the difference. In a further aspect, the reference pictures may be defined by a communication syntax according to Table 4. In a further aspect, the bitstream syntax for each entry in the list of reference frames may include a flag indicating if an absolute POC is used and an indicator of the reference frame, wherein: if the flag indicates an absolute reference is used, the indicator of the reference frame includes least significant bits of the POC of the reference frame; and if the flag indicates an absolute reference frame is not used, the indicator of the reference frame includes a difference in a (POC) between a current frame and the reference frame. In a further aspect, the reference pictures may be defined by a communication syntax according to Table 5.

In further aspects of these techniques, the bitstream syntax for each entry in the list of reference frames includes a flag indicating if prediction of motion vectors from the respective reference picture are to be based on POC information or not based on POC information. In further aspect, the reference pictures may be defined by a communication syntax according to Table 6. In further aspect, the bitstream syntax for each entry in the list of reference frames may include a consider_POC flag indicating if prediction of motion vectors from the respective reference picture are to be based on POC information or not, an absolute_ref flag indicating if an absolute POC is used, and an indicator of the reference frame, wherein: if the absolute_ref flag indicates an absolute reference is used, the indicator of the reference frame includes least significant bits of the POC of the reference frame; if the absolute_ref flag indicates an absolute reference frame is not used, the indicator of the reference frame includes a difference in a (POC) between a current frame and the reference frame. In further aspect, the reference pictures may be defined by a communication syntax according to Table 6.5. In further aspect, if the consider_POC flag indicates prediction is based on POC information, the bitstream syntax for each entry may further include a weighting parameter. In further aspect, the reference pictures may be defined by a communication syntax according to Table 7. In further aspect, the list of all reference pictures may be included in a slice header, and the portion of bitstream syntax in which the list of reference pictures may be used corresponds to a slice.

In an aspect a method may comprise: responsive to a bitstream of a coded sequence of pictures, deriving a list of all reference pictures used in decoding of a portion of bitstream syntax essentially consisting of a single list of reference pictures including single number indicating the total number of all reference frames; and evicting decoded pictures from a DPB that are not in the list; wherein reference frames in the single list are identified by a difference in a picture order count (POC) between a current frame and an identified reference frame.

In an aspect a method may comprise: responsive to a bitstream of a coded sequence of pictures, deriving a list of all reference pictures used in decoding of a portion of bitstream syntax essentially consisting of a single list of reference pictures including single number indicating the total number of all reference frames; and evicting decoded pictures from a DPB that are not in the list; wherein reference frames in the single list are identified by a difference in a picture order count (POC) between a current frame and an identified reference frame; wherein the bitstream syntax for the difference in POC includes a magnitude of the difference, and, if the magnitude is not zero, a flag indicating a sign of the difference.

In an aspect a method may comprise: responsive to a bitstream of a coded sequence of pictures, deriving a list of all reference pictures used in decoding of a portion of bitstream syntax essentially consisting of a single list of reference pictures including single number indicating the total number of all reference frames; and evicting decoded pictures from a DPB that are not in the list; wherein reference frames in the single list are identified by a difference in a picture order count (POC) between a current frame and an identified reference frame; wherein the bitstream syntax for the difference in POC includes, for the first reference frame in the list, a magnitude of the difference, and always includes a flag indicating a sign of the difference, and, for subsequent reference frames in the list, a magnitude of the difference, and, only if the magnitude is not zero, a flag indicating a sign of the difference.

In an aspect a method may comprise: responsive to a bitstream of a coded sequence of pictures, deriving a list of all reference pictures used in decoding of a portion of bitstream syntax essentially consisting of a single list of reference pictures including single number indicating the total number of all reference frames; and evicting decoded pictures from a DPB that are not in the list; wherein the bitstream syntax for each entry in the list of reference frames includes a flag indicating if an absolute POC is used and an indicator of the reference frame, and wherein, if the flag indicates an absolute reference is used, the indicator of the reference frame includes least significant bits of the POC of the reference frame, and if the flag indicates an absolute reference frame is not used, the indicator of the reference frame includes a difference in a (POC) between a current frame and the reference frame.

In an aspect a method may comprise: responsive to a bitstream of a coded sequence of pictures, deriving a list of all reference pictures used in decoding of a portion of bitstream syntax essentially consisting of a single list of reference pictures including single number indicating the total number of all reference frames; and evicting decoded pictures from a DPB that are not in the list; wherein the bitstream syntax for each entry in the list of reference frames includes a flag indicating if prediction of motion vectors from the respective reference picture are to be based on POC information or not based on POC information.

In an aspect a method may comprise: responsive to a bitstream of a coded sequence of pictures, deriving a list of all reference pictures used in decoding of a portion of bitstream syntax essentially consisting of a single list of reference pictures including single number indicating the total number of all reference frames; and evicting decoded pictures from a DPB that are not in the list; wherein the bitstream syntax for each entry in the list of reference frames includes a consider_POC flag indicating if prediction of motion vectors from the respective reference picture are to be based on POC information or not, an absolute_ref flag indicating if an absolute POC is used, and an indicator of the reference frame, and wherein, if the absolute_ref flag indicates an absolute reference is used, the indicator of the reference frame includes least significant bits of the POC of the reference frame, and if the absolute_ref flag indicates an absolute reference frame is not used, the indicator of the reference frame includes a difference in a (POC) between a current frame and the reference frame.

In an aspect a method may comprise: responsive to a bitstream of a coded sequence of pictures, deriving a list of all reference pictures used in decoding of a portion of bitstream syntax essentially consisting of a single list of reference pictures including single number indicating the total number of all reference frames; and evicting decoded pictures from a DPB that are not in the list; wherein the bitstream syntax for each entry in the list of reference frames includes a flag indicating if prediction of motion vectors from the respective reference picture are to be based on POC information or not based on POC information; wherein, if the consider_POC flag indicates prediction is based on POC information, the bitstream syntax for each entry further includes a weighting parameter.

DETAILED DESCRIPTION

Figure 1:
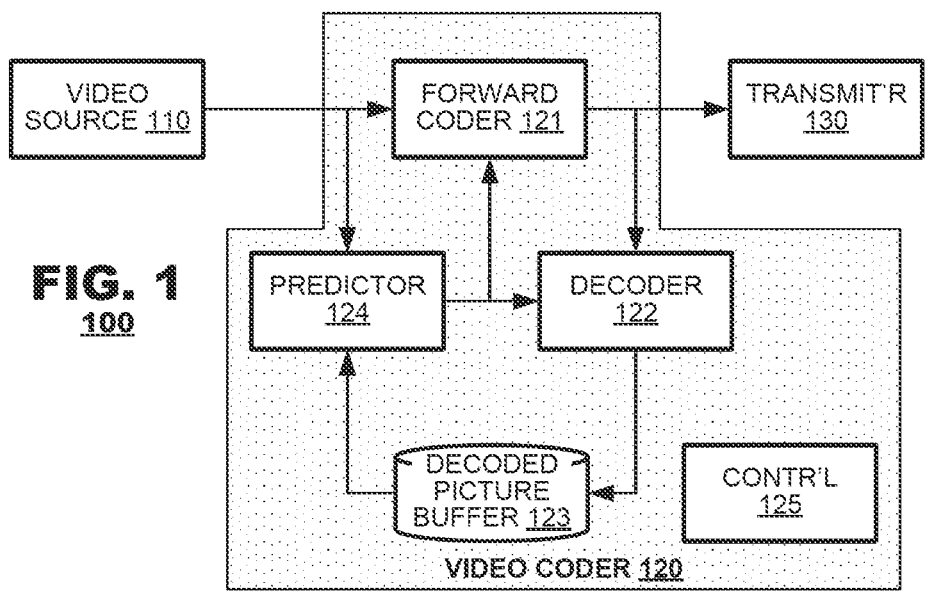
FIG. 1 is a simplified block diagram of an example video coding system.

To avoid memory and efficiency issues associated with using all previously coded pictures as prediction references, modern video codecs such as MPEG-4 AVC/H.264, HEVC/H.265, VVC/H.266, and AV1 provide mechanisms that limit the number of the available references for each picture. There is commonly a Decoded Picture Buffer (DPB) of limited size (i.e. how many reference pictures it may maintain any given time) that is updated and maintained using well specified processes. Well defined processes are also used for the construction of the reference picture lists that are used for inter prediction for single prediction (e.g. a prediction based on a single reference) and biprediction (e.g. a prediction based on two references).

In particular, in the AVC specification a well-defined process, based on a "sliding window" mechanism, that is also augmented by "explicitly" signaled memory management control operation (MMCO) instructions, is provided for the construction of the DPB. In this process pictures are essentially added in the DPB based on whether the pictures are signaled as references or not, and indicators (FrameNum) are associated with these pictures that relate to their coding order. Although commonly a sliding window (first in-first out) approach is used for controlling which pictures would remain in the DPB, based on the DPB size, the MMCO instructions may also override the sliding window operations by either specifying explicitly the removal of certain frames or by also tagging as certain frames as long-term reference frames. If a frame is tagged as a long-term reference frame, this frame will only be removed through either an explicit MMCO instruction specifying its removal, or through the signaling of an Instantaneous Decoder Refresh (IDR) frame. IDR frames specify that all frames in the DPB should be removed immediately. AVC specified that lists of reference pictures were constructed based on either a predefined process that used the FrameNum information (for P slices) and the Picture Order Count (POC) parameter associated with each reference picture to sort the pictures, or AVC used a process named as the "reference picture list modification" process that explicitly specified the order of the reference pictures in each list. A POC parameter may be a number uniquely identifying each frame in a coded video sequence, and hence a POC parameter may also uniquely identify each reference frame.

Techniques for encoding video with motion compensation include a compressed bitstream syntax indicating a current list of motion prediction reference frames without distinguishing between short-term reference frame and long-term reference frames. The list of reference frames may be provided, for example, in a slice header and may apply to encoded data video data within the corresponding slice. The list may be prefaced with a single number indicating the total number of reference frames. In an aspect the list may identify reference frame by an absolute POC number associated with each reference frame, or by a delta POC numbers indicating the difference between the absolute POC of a current frame and the absolute POC of each reference frame. In an aspect delta POC reference numbers may be encoded with a flag indicating the sign of the delta POC when the absolute value of the POC is not equal to zero. In an aspect a flag may be encoded for every reference frame indicating if POC information should be used when scaling prediction references, and a weighting parameter may be included when POC information should be used.

In an aspect, the list of all motion prediction references may be used to manage a decoded picture buffer (DPB), for example, by evicting references previously stored in DPB that are no longer included in the current list of references. In another aspect, motion vectors may be predicted using POC information only when a flag for the reference frame indicates POC information should be used. In an aspect a DPB in an encoder may be managed to mimic a DPB in a decoder based on the list of reference frame provided by the encoder in a bitstream syntax that is transmitted to the decoder.

FIG. 1 is a simplified block diagram of an example video coding system 100. The principles of the present disclosure find application in a video coding system that includes a video coder 120 and a video decoder. An embodiment of the video coder 120 is illustrated in FIG. 1 Here, the video coder 120 may receive video data from a video source 110 and code the video data to provide bandwidth compression. The video coder 120 is shown as including a forward coder 121, a decoder 122, a decoded picture buffer (DPB) 123, and a predictor 124. The DPB 123 may store decoded pictures of previously-coded and decoded reference frames that are available for use in inter prediction of a new input frame. The predictor 124 may compare content of new input frames that are to be coded to content of the reference frame(s) stored in the DPB 123, typically at sub-frame granularities called coding units, and may supply content of a prediction reference to the forward coder 121.

The forward coder 121 may code each coding unit of the new input frame according to a selected coding mode. When inter prediction is selected for coding, the forward coder may code the input coding unit differentially with respect to the prediction coding unit. The forward coder 121 may apply additional coding processes such as quantization and entropy coding. The forward coder 121 may output data representing the coded coding units to a transmitter 140 for transmission to another device.

When a new input frame is selected to serve as a reference frame, the decoder 122 inverts coding operations applied by the forward coder 121 and generates a decoded reference frame therefrom. The decoded reference frame may be stored in the DPB 123 for use as a candidate prediction reference for coding later-received input video.

The video coding may include a controller 125. The controller 125 may control which frames are selected to serve as reference frames and may manage the DPB 123 according to the processes described above. When DPB management decisions are made, the controller 125 may cause the transmitter 130 to transmit signaling according to any of the techniques described in the Tables 2 to 7.

Figure 2:
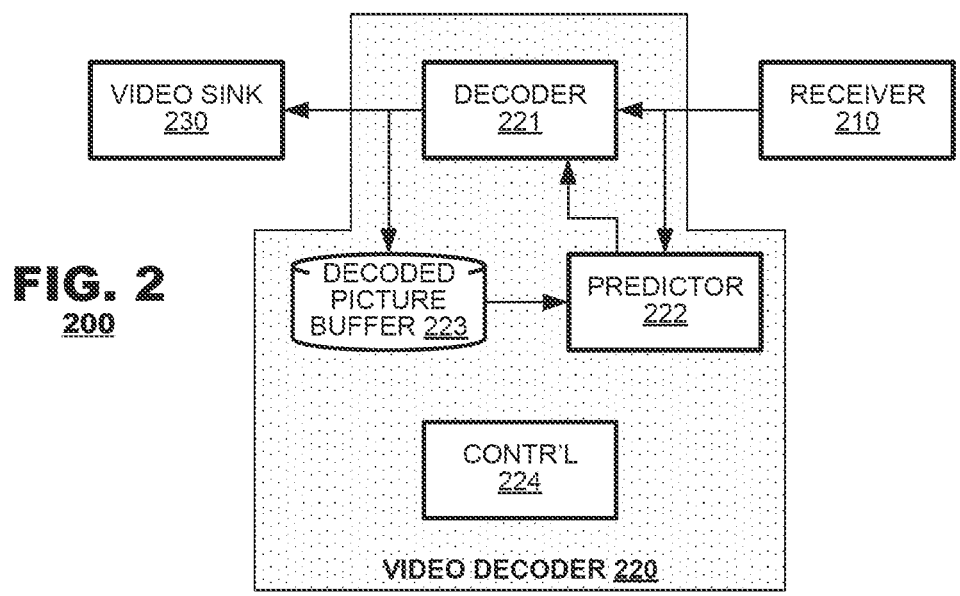
FIG. 2 is a simplified block diagram of an example decoding system.

FIG. 2 is a simplified block diagram of an example decoding system 200. Coded video data typically is transmitted to a video decoder (FIG. 2), where it is decoded and consumed. A receiver 210 may receive coded video data from a communication or computer network or from a storage device (not shown), and it may route the coded video data to a video decoder 220 for decoding.

The video decoder 220 may include a decoder 221, a predictor 222, a decoded picture buffer 223, and a controller 224. The predictor 222 may respond to identifiers of coding decisions applied to the coded video data to identify data from the decoded picture buffer 223 that is a prediction reference for each coded coding unit, and the predictor 222 may supply the reference data to the decoder 221. The decoder 221 may invert coding operations applied by the forward coder 121 (FIG. 1) of the video encoder 120. The decoder 221 may generate decoded frames of video therefrom, and it may output the decoded frames to a video sink device 230 (such as a display, a storage device or an application that processes such video) for consumption.

Decoded data of frames designated as reference frames may be stored in the decoded picture buffer 223. In the absence of transmission errors between the video coder 120 and the video decoder 220 content of the DPBs 123, 223 would remain synchronized with each other.

The video decoder's controller 224 may perform DPB management operations as described in the foregoing, in response to signaling provided in the channel. Thus, when the controller 224 receives signaling, for example, as shown in any the foregoing Tables 2-7, it may perform corresponding management operations on its DPB 223.

Figure 3:
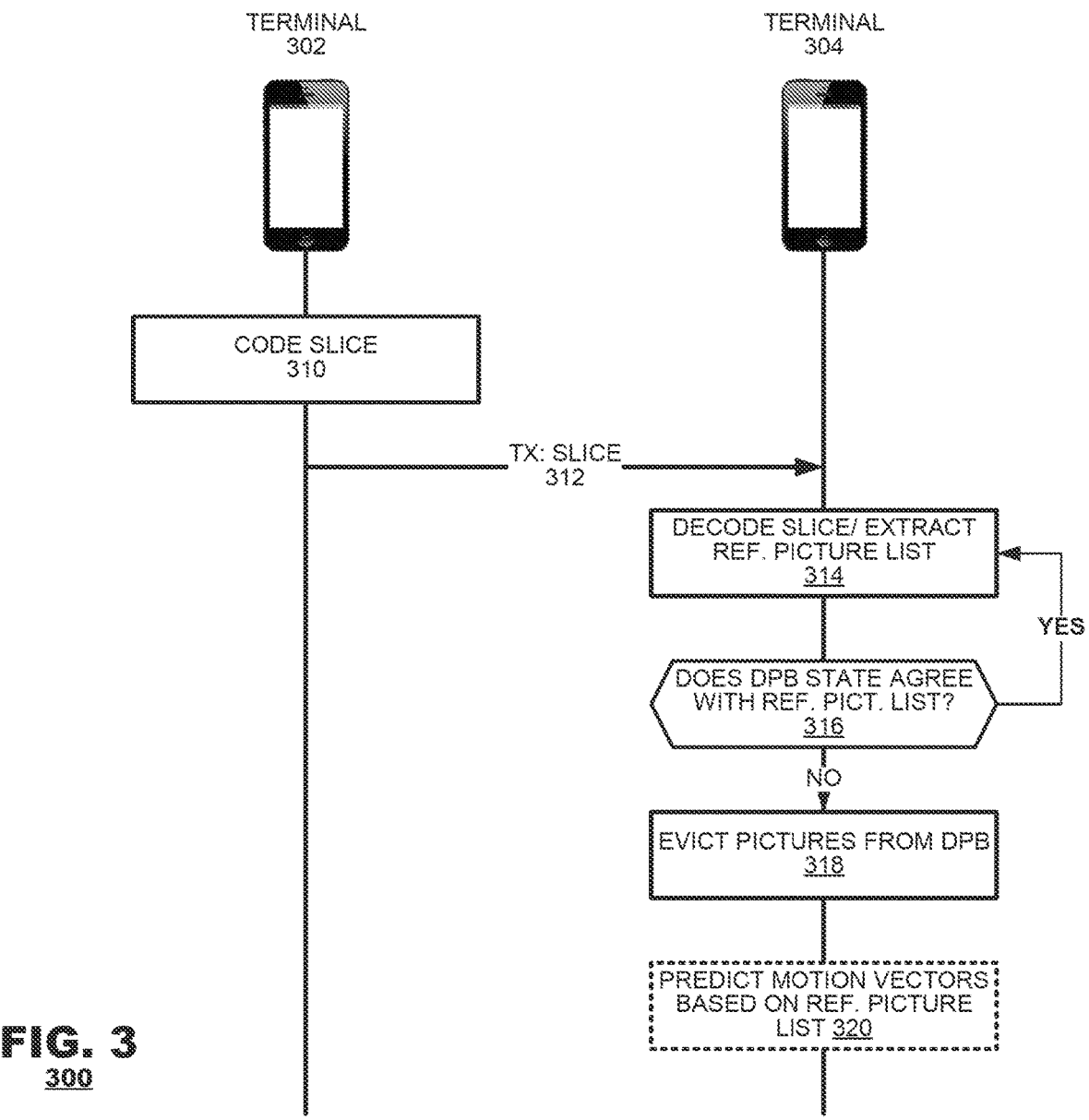
FIG. 3 depicts a method for management of a decoded picture buffer (DPB).

FIG. 3 depicts a method for management of a decoded picture buffer (DPB). Terminal 302 may encode video, for example using the encoding system 100 of FIG. 1, and terminal 304 may decode video, for example using the decoding system 200 of FIG. 2. In the method of FIG. 3, terminal 302 repeated codes a slice of video (box 310) into a bitstream with a bitstream syntax that includes a reference picture list, and then transmits the bitstream of the slice to terminal 304 (message 312). Terminal 304 then decodes the slice, including extracting the reference picture list from the slice bitstream (box 314). If the state of a DPB in terminal 304 does not agree with the reference picture list (box), reference pictures not in the current list may be evicted (box 318), otherwise control may flow to box 320. These methods may be repeated for subsequent slices in both terminals 302 and 304.

In optional box 320, image data may be predicted based on the extracted current reference picture list. For example, image data may be predicted from one or more pictures in the reference picture list based on motion vectors extracted from the bitstream. Predicted image data may then form the basis for decoded frames, as described above regarding decoder 200 of FIG. 2 above, and the decoded frames may be stored for future use as new reference frames in the DPB. The new reference frames themselves may also be evicted from the DPB, for example, based on a later reference picture list specified later in the bitstream.

The AVC design, as explained in the background section above, had the major flaw that it required knowledge of how reference frames were handled in the past to properly maintain the DPB. Any operations such as splicing, channel change, and editing could result in loss of such information, and therefore impair the decoding process. Therefore, in HEVC a different approach was used where a complete set of the reference pictures potentially used by the current picture as well as any subsequent picture is signaled. This is referred to as the reference picture set (RPS) process. Doing so guarantees that every time the decoder knows which pictures may be utilized for prediction. The HEVC design also includes a list initialization process as well as an optional picture list modification process to generate the prediction lists.

Although the HEVC approach avoided the problems of the AVC design, there were complaints that the process was too complex and difficult to understand. Therefore, for the upcoming VVC/H.266 video coding standard it was proposed that a new approach, that unifies the RPS process and the reference list construction process should be adopted. In particular, it was proposed that instead for signaling the RPS followed by the optional reference list modification process, a reference picture list structure (RPLS) is signaled instead that combines the indication of which references should be in the DPB with the construction of an initial representation of the two reference lists. Essentially, this specifies all reference entries that should remain in the DPB, in the appropriate order for each list. The process is then followed by an indication of how many references should be retained for each list in ascending order. In these systems, short-term and long-term references were still retained, while the number of references that could be used was restricted to the size of the DPB. The signaling of the reference picture list structure for this method is shown below, which includes the number of short-term and long-term references signaled, whether a picture is a long-term picture or not, and information to identify them in the bitstream. Such information can be relative (delta POCs) compared to the current reference for short-term reference pictures, or absolute for long-term reference pictures.

TABLE 1

| | Descriptor |
|---|---|
| ref_pic_list_struct( listIdx, rplsIdx, ltrpFlag ) { | |
|   num_strp_entries[ listIdx ][ rplsIdx ] | ue(v) |
|   if( ltrpFlag ) | |
|     num_ltrp_entries[ listIdx ][ rplsIdx ] | ue(v) |
|   for( i = 0; i < NumEntriesInList[ listIdx ][ rplsIdx ]; i++ ) { | |
|     if( num_ltrp_entries[ listIdx ][ rplsIdx ] > 0 ) | |
|       lt_ref_pic_flag[ listIdx ][ rplsIdx ][ i ] | u(1) |
|     if( !lt_ref_pic_flag[ listIdx ][ rplsIdx ][ i ] ) { | |
|       delta_poc_st[ listIdx ][ rplsIdx ][ i ] | ue(v) |
|       if( delta_poc_st[ listIdx ][ rplsIdx ][ i ] > 0 ) | |
|         strp_entry_sign_flag[ listIdx ][ rplsIdx ][ i ] | u(1) |
|     } else | |
|       poc_lsb_lt[ listIdx ][ rplsIdx ][ i ] | u(v) |
|   } | |
| } | |

In this disclosure, the methodology proposed to the VVC specification is improved by, first, removing the concept of long-term references. In particular, there may be limited value in separating the references in short-term and long-term references. The proposed method already has the ability to indicate which frames should be retained for the prediction of the current or potentially future pictures, and the classification of whether a picture is a short-term or a long-term does not seem to provide any benefits in this context. Instead, the encoder can signal which past pictures should be used as reference and make no explicit identification of short-term or long-term references. In an example, this could be done with the following syntax:

TABLE 2

| | Descriptor |
|---|---|
| ref_pic_list_struct( listIdx, rplsIdx ) { | |
|   num_ref_entries[ listIdx ][ rplsIdx ] | ue(v) |
|   for( i = 0; i < num_ref_entries[ listIdx ][ rplsIdx ]; i++ ) { | |
|     abs_delta_poc_ref[ listIdx ][ rplsIdx ][ i ] | ue(v) |
|     if(abs_delta_poc_ref[ listIdx ][ rplsIdx ][ i ] > 0 ) | |

TABLE 2-continued

| | Descriptor |
|---|---|
|       sign_delta_poc_ref[ listIdx ][ rplsIdx ][ i ] | u(1) |
|   } | |
| } | |

Or:

TABLE 3

| | Descriptor |
|---|---|
| ref_pic_list_struct( listIdx, rplsIdx ) { | |
|   num_ref_entries[ listIdx ][ rplsIdx ] | ue(v) |
|   for( i = 0; i < num_ref_entries[ listIdx ][ rplsIdx ]; i++ ) { | |
|     delta_poc_ref[ listIdx ][ rplsIdx ][ i ] | se(v) |
|   } | |
| } | |

In these examples, the relative distances in terms of POC between the current picture and the references are indicated. For index i=0, the distance between the current picture and the first reference is used. For indices i>0, the distances versus the current picture can be computed, or, in an alternative embodiment, the POC distance between the reference of index I and reference of index i−1. If the codec does not permit prediction of the current picture using itself, i.e. availability of the "current picture reference" method, the value of 0 for the reference with index i=0 would not be possible. In that case, the first case can be modified to the following:

TABLE 4

| | Descriptor |
|---|---|
| ref_pic_list_struct( listIdx, rplsIdx ) { | |
|   num_ref_entries[ listIdx ][ rplsIdx ] | ue(v) |
|   if(num_ref_entries[ listIdx ][ rplsIdx ] > 0) { | |
|     abs_delta_poc_ref_minus1[ listIdx ][ rplsIdx ][ 0 ] | ue(v) |
|     sign_delta_poc_ref[ listIdx ][ rplsIdx ][ 0 ] | u(1) |
|   } | |
|   for( i = 1; i < num_ref_entries[ listIdx ][ rplsIdx ]; i++ ) { | |
|     abs_delta_poc_ref[ listIdx ][ rplsIdx ][ i ] | ue(v) |
|     if(abs_delta_poc_ref[ listIdx ][ rplsIdx ][ i ] > 0 ) | |
|       sign_delta_poc_ref[ listIdx ][ rplsIdx ][ i ] | u(1) |
|   } | |
| } | |

Another alternative would be to permit indicating instead of the delta POC for some pictures their absolute POC number. This could be done as follows:

TABLE 5

| | Descriptor |
|---|---|
| ref_pic_list_struct( listIdx, rplsIdx ) { | |
|   num_ref_entries[ listIdx ][ rplsIdx ] | ue(v) |
|   for( i = 0; i < num_ref_entries[ listIdx ][ rplsIdx ]; i++ ) { | |
|     absolute_ref_pic_flag[ listIdx ][ rplsIdx ][ i ] | u(1) |
|     if( !absolute_ref_pic_flag[ listIdx ][ rplsIdx ][ i ] ) { | |
|       abs_delta_poc_ref[ listIdx ][ rplsIdx ][ i ] | ue(v) |
|       if(abs_delta_poc_ref[ listIdx ][ rplsIdx ][ i ] > 0 ) | |
|         sign_delta_poc_ref[ listIdx ][ rplsIdx ][ i ] | u(1) |
|     } else | |
|       poc_lsb_ref[ listIdx ][ rplsIdx ][ i ] | u(v) |
|   } | |
| } | |

Note that poc_lsb_ref needs not be of the same size as the slice_pic_order_cnt_lsb that is used to signal the picture order count modulo MaxPicOrderCntLsb of the current picture. It could also be larger and its size could be indicated with an additional parameter that is signaled at the sequence or picture parameter set level. That can allow signaling of references that are further away from the current picture than a distance of MaxPicOrderCntLsb, similar to what is done for long-term references. However, those references may still not be considered long-term references. Alternatively, the encoder can optionally also signal an additional parameter either for each reference or for the entire reference group that would specify an additional fixed distance for those references versus the current reference. Absolute position references could be considered in the delta distance computation or could be excluded from it.

Long-term references in AVC and HEVC also impact the computation of weighted prediction (AVC) and motion vector prediction (AVC and HEVC). This is because for long-term references it is assumed that using the temporal relationship between pictures, hinted by POC parameters, may be unreliable. Since in the proposed system, it is not explicitly indicated whether a picture is long-term or short-term, that capability may be lost. Instead, and if such capability is retained, a flag can be indicated that would specify whether the POC information for a particular reference should be used for such computations or not. This could be done, for example as follows, by introducing a new flag, such as, for example, consider_poc_for_derivations_flag. This new flag could be signaled for every reference, could be signaled equally for all references, or could also be signaled only for certain types of references, e.g. for the references that signaled in AVC or HEVC with the absolute POC lsb. An example of signaling this is as follows:

TABLE 6

| | Descriptor |
|---|---|
| ref_pic_list_struct( listIdx, rplsIdx) { | |
|   num_ref_entries[ listIdx ][ rplsIdx ] | ue(v) |
|   for( i = 0; i < num_ref_entries[ listIdx ][ rplsIdx ]; i++) { | |
|     consider_poc_for_derivations_flag[ listIdx ][ rplsIdx ][ i ] | u(1) |
|     abs_delta_poc_ref[ listIdx ][ rplsIdx ][ i ] | ue(v) |
|     if(abs_delta_poc_ref[ listIdx ][ rplsIdx ][ i ] > 0 ) | |

TABLE 6-continued

| | Descriptor |
|---|---|
|     sign_delta_poc_ref[ listIdx ][ rplsIdx ][ i ] | u(1) |
|   } | |
| } | |

The bitstream syntax embodiments of Tables 5 and 6 can be combined to provide flags indicating absolute POC or delta POC, and for indicating if reference frame POC are to be used as hints for motion vector prediction:

TABLE 6.5

| | Descriptor |
|---|---|
| ref_pic_list_struct( listIdx, rplsIdx ) { | |
|   num_ref_entries[ listIdx ][ rplsIdx ] | ue(v) |
|   for( i = 0; i < num_ref_entries[ listIdx ][ rplsIdx ]; i++) { | |
|     consider_poc_for_derivations_flag[ listIdx ][ rplsIdx ][ i ] | u(1) |
|     if( !absolute_ref_pic_flag[ listIdx ][ rplsIdx ][ i ] ) { | |
|       abs_delta_poc_ref[ listIdx ][ rplsIdx ][ i ] | ue(v) |
|       if( abs_delta_poc_ref[ listIdx ][ rplsIdx ][ i ] > 0 ) | |
|         sign_delta_poc_ref [ listIdx ][ rplsIdx ][ i ] | u(1) |
|     } else | |
|       poc_lsb_lt[ listIdx ][ rplsIdx ][ i ] | u(v) |
|   } | |
| } | |

In an alternative embodiment, the POC may be associated only with the construction of the DPB and signal an additional parameter that will dictate the scaling parameter that should be used during prediction and decoding operations (such as for scaling motion vectors). Such scaling parameter could be specified during the decoding of the current picture and could persist through the entire presence of this picture in the DPB but could also be signaled explicitly and dynamically inside the ref pic list struct. The value that should be used for the current picture, when combined with the references in this list, similar to what is done now for POC, can then also be signaled (current pic_weight[listIdx] below). By using this method different scaling of any related parameters could be achieved for different pictures or even subgroups. All these parameters and their presence could also be controlled through parameters at higher level syntax elements.

TABLE 7

| | Descriptor |
|---|---|
| ref_pic_list_struct( listIdx, rplsIdx) { | |
|   num_ref_entries[ listIdx ][ rplsIdx ] | ue(v) |
|   refDerivationCount = 0 | |
|   for( i = 0; i < num_ref_entries[ listIdx ][ rplsIdx ]; i++) { | |
|     consider_ref_for_derivations_flag[ listIdx ][ rplsIdx ][ i ] | u(1) |
|     abs_delta_poc_ref[ listIdx ][ rplsIdx ][ i ] | ue(v) |
|     if(abs_delta_poc_ref[ listIdx ][ rplsIdx ][ i ] > 0 ) | |
|       sign_delta_poc_ref[ listIdx ][ rplsIdx ][ i ] | u(1) |
|     if (consider_ref_for_derivations_flag[ listIdx ][ rplsIdx ][ i ] == TRUE) { | |
|       ref_weight_param[ listIdx ][ rplsIdx ][ i ] | se(v) |
|       refDerivationCount ++ | |
|     } | |
|   } | |
|   if (refDerivationCount > 0 ) | |
|     current_pic_weight[ listIdx ] | se(v) |
| } | |

The above structures permit replication of references, especially if such replication is to be used to allow multi-hypothesis prediction using the same reference, including multi-hypothesis prediction with more than two (2) defined reference lists, or for weighted prediction purposes. For weighted prediction, the same "physical reference" may be associated with different weighted prediction parameters, but the codec only permits weighted prediction parameter signaling at the slice or higher level and not at the block level (as in AVC and HEVC). In that case, commonly the same reference is specified multiple times in a reference list, and each instance of that reference is associated with a different weight. HEVC, for example, permits up to 15 such references for each list. However, such replicated references do not require any additional memory space and therefore should not be considered as taking up space in the DPB. The same is also true for references that may be present in multiple lists. Only "unique" references, and essentially the union of all unique references across all prediction lists should be considered for determining the pictures that should be retained in the DPB.

Codecs like HEVC and AVC utilize also parallelization "grouping" concepts of blocks such as tiles or slices. For these groups it is important that the complete DPB and reference list information are also available. In AVC and HEVC it was mandated that the DPB information was identical across all slices, and this was handled appropriately by replicating the needed information for each codec across all slices (i.e. MMCO+sliding window operations in AVC and RPS process in HEVC). Similar considerations need to be made in VVC. However here there are the following options:

a) Repeat exactly the same RPLS for all slices/tiles/groups. This will guarantee that the DPB can be constructed identically for all such groups, however it has the limitation that the construction of the reference lists is less flexible and likely less efficient. This could still be combined with different weighted prediction parameters since those could be signaled with a different set. However, weighted parameters could also be restricted to be the same.

b) Permit the RPLS to be different in terms of picture ordering and replication of references, however, guarantee that the same pictures are present at least once in the RPLS for every slice/tile/group, even if not used for prediction, so as to guarantee that the DPB is constructed the same for all such groups.

c) Allow the RPLS to differ for each group. In this case, however, one should consider the "union" of all RPLS to construct the DPB. This can provide coding benefits, but requires parsing of all RPLS in all groups and may complicate also the design of parallel decoding systems or systems that may wish to perform partial image decoding based on sub-groups (e.g. using motion constraint tiled principles used for example in 360 degree applications).

d) Signal the full DPB in the first RPLS (first group/tile/slice), while permitting all other groups to use a reduced RPLS version with only the necessary pictures for performing prediction in the current group. The benefit of this would be that a system that needs to know which references are used would only need to parse the first group while ignoring the other groups. This saves bits, however, it may be more error prone and would have the same issues as case (c) in terms of parallel decoding. In this case, if so desired, the full DPB could be signaled optionally in other groups as well but will not be enforced. Enforcement however could also be done by application or usage, and there could even be signals in the bitstream that say that such enforcement is used or not.

The above concepts could be used on their own, in combination with other mechanisms for managing DPB and references, including sliding window or some other predefined mechanism that specifies how pictures are added and removed from the DPB, signaling of reference lists/DPB at sequence or picture parameter sets, use of memory management operations for some pictures and so on.

As discussed above, FIGS. 1 and 2 illustrate functional block diagrams of terminals. In implementation, the terminals may be embodied as hardware systems, in which case, the illustrated blocks may correspond to circuit sub-systems. Alternatively, the terminals may be embodied as software systems, in which case, the blocks illustrated may correspond to program modules within software programs executed by a computer processor. In yet another embodiment, the terminals may be hybrid systems involving both hardware circuit systems and software programs. Moreover, not all of the functional blocks described herein need be provided or need be provided as separate units. For example, although FIG. 1 illustrates the components of an exemplary encoder, including components such as the forward coder 121 and decoder 122, as separate units. In one or more embodiments, some components may be integrated. Such implementation details are immaterial to the operation of the present invention unless otherwise noted above. Similarly, the encoding, decoding and buffer management operations described with relation to FIG. 3 may be performed continuously as data is input into the encoder/decoder. The order of the steps as described above does not limit the order of operations.

Some embodiments may be implemented, for example, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine-readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The "machine readable storage media" may include any medium that can store information. Examples of a machine-readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some embodiments, variations within the scope and spirit of the invention will be apparent to those of ordinary skill in the art. Thus, the invention should be considered as limited only by the scope of the appended claims.

We claim:

1. A method for managing a decoded picture buffer (DPB) of a decoder comprising:

responsive to a bitstream of a coded sequence of pictures, deriving a list of all reference pictures to be stored in the DPB while decoding a portion of the bitstream, the list derived from a bitstream syntax essentially consisting of a single list of reference pictures including a single number indicating a total number of all reference pictures used in the portion of the bitstream;

parsing, from the bitstream syntax for the single list of reference pictures, an identification of the reference picture by a difference in a picture order count (POC) between a current picture and the identified reference picture and an indication of a weighting of the reference picture;

decoding a target picture in the coded sequence of pictures including predicting a portion of the target picture from the reference picture based on the indication of the weighting.

2. The method of claim 1, further comprising:
wherein the indication of the weighting of the reference picture includes an indication of a weighting derivations flag indicating whether or not the weighting of the reference picture is to be derived based on the POC of the reference picture.

3. The method of claim 1, further comprising:
wherein the single list includes multiple entries with the same reference picture, and a first entry with a common reference picture includes an indication of a first weight different from a second weight in a second entry for the same reference picture.

4. The method of claim 1, further comprising:
evicting decoded pictures from a DPB that are not in the list.

5. The method of claim 1, wherein the parsing of the identification of the reference picture includes:
parsing a magnitude of the difference in POC;
determining if the magnitude of the difference is greater than zero; and
when the magnitude is determined to be greater than zero, parsing a flag indicating a sign of the difference.

6. A non-transitory computer readable medium containing instructions that, when executed on a processor, cause:
responsive to a bitstream of a coded sequence of pictures, deriving a list of all reference pictures to be stored in the DPB while decoding a portion of the bitstream, the list derived from a bitstream syntax essentially consisting of a single list of reference pictures including a single number indicating a total number of all reference pictures used in the portion of the bitstream;
parsing, from the bitstream syntax for the single list of reference pictures, an identification of a reference picture by a difference in a picture order count (POC) between a current picture and the identified reference picture and an indication of a weighting of the reference picture;
decoding a target picture in the coded sequence of pictures including predicting a portion of the target picture from the reference picture based on the indication of the weighting.

7. A video decoder comprising:
a decoded picture buffer (DPB);
a decoder for decoding compressed video and storing reference pictures in the DPB;
a predictor for predicting from reference pictures in the DPB; and
a controller with instructions that cause the decoder to:
responsive to a bitstream of a coded sequence of pictures, deriving a list of all reference pictures to be stored in the DPB while decoding a portion of the bitstream, the list derived from a bitstream syntax essentially consisting of a single list of reference pictures including a single number indicating a total number of all reference pictures used in the portion of the bitstream;

parsing, from the bitstream syntax for the single list of reference pictures, an identification of the reference picture by a difference in a picture order count (POC) between a current picture and the identified reference picture and an indication of a weighting of the reference picture;

decoding a target picture in the coded sequence of pictures including predicting a portion of the target picture from the reference picture based on the indication of the weighting.

8. A method for managing a decoded picture buffer (DPB) of an encoder comprising:
encoding a source picture of a sequence of pictures into an encoded bitstream including predicting a portion of the source picture from a reference picture based on the indication of a weighting for the reference picture;
including, in the encoded bitstream, a list of all reference pictures to be stored in the DPB while decoding a portion of the encoded bitstream in a bitstream syntax essentially consisting of a single list of reference pictures including a single number indicating a total number of all reference pictures used in the portion of the bitstream;
including, in the bitstream syntax for the single list of reference pictures, an identification of the reference picture by a difference in a picture order count (POC) between a current picture and the identified reference picture and an indication of the weighting of the reference picture.

9. The method of claim 8, further comprising:
wherein the indication of the weighting of the reference picture includes an indication of a weighting derivations flag indicating whether or not the weighting of the reference picture should be derived based on the POC of the reference picture.

10. The method of claim 8, further comprising:
wherein the single list includes multiple entries with a common reference picture, and a first entry with the same reference picture includes an indication of a first weight different from a second weight in a second entry for the same reference picture.

11. The method of claim 8, further comprising:
evicting decoded pictures from a DPB that are not in the list.

12. The method of claim 8, wherein the identification of the reference picture includes:
a magnitude of the difference in POC; and
when the magnitude is determined to be greater than zero, a flag indicating a sign of the difference.

13. A non-transitory computer readable medium containing instructions that, when executed on a processor, cause:
encoding a source picture of a sequence of pictures into an encoded bitstream including predicting a portion of the source picture from a reference picture based on the indication of the weighting for the reference picture;
including, in the encoded bitstream, a list of all reference pictures to be stored in the DPB while decoding a portion of the encoded bitstream in a bitstream syntax essentially consisting of a single list of reference pictures including a single number indicating a total number of all reference pictures used in the portion of the bitstream;
including, in the bitstream syntax for the single list of reference pictures, an identification of the reference picture by a difference in a picture order count (POC) between a current picture and the identified reference picture and an indication of a weighting of the reference picture.

14. A video encoder comprising:
a decoded picture buffer (DPB);
a decoder for decoding encoded pictures and storing reference pictures in the DPB;
a predictor for predicting from reference pictures in the DPB; and
a controller with instructions that cause the encoder to:
  encoding a source picture of a sequence of pictures into an encoded bitstream including predicting, with the predictor, a portion of the source picture from a reference picture in the DPB based on the indication of the weighting for the reference picture;
  including, in the encoded bitstream, a list of all reference pictures to be stored in the DPB while decoding a portion of the encoded bitstream in a bitstream syntax essentially consisting of a single list of reference pictures including a single number indicating a total number of all reference pictures used in the portion of the bitstream;
  including, in the bitstream syntax for the single list of reference pictures, an identification of the reference picture by a difference in a picture order count (POC) between a current picture and the identified reference picture and an indication of a weighting of the reference picture.

* * * * *